United States Patent Office 2,776,263
Patented Jan. 1, 1957

2,776,263
CORROSION INHIBITORS FOR DEUTERIUM EXCHANGE PROCESS

Clarence F. Hiskey, Brooklyn, N. Y., and Dwayne T. Vier, Santa Fe, N. Mex., assignors to the United States of America as represented by the United States Atomic Energy Commission No Drawing. Application April 16, 1945,
Serial No. 588,479½

2 Claims. (Cl. 252—390)

This invention relates to the exchange of isotopes between substances containing them. In particular, it relates to the exchange of the isotope of hydrogen called deuterium between hydrogen sulfide gas and water.

One of the satisfactory methods of making deuterium water is by the exchange reaction between hydrogen sulfide and water, which is carried out in tubular apparatus through which the water flows from the top while hydrogen sulfide gas is admitted at the bottom. This counter-current flow of water and hydrogen sulfide results in the transfer of the deuterium in the hydrogen sulfide to the water while, at the same time, hydrogen from the water replaces the deuterium extracted from the hydrogen sulfide.

Stainless steel is a good material for the construction of deuterium exchange reaction apparatus, except that it is too expensive, and that it is not always possible to construct of it for other reasons. Under such circumstances it is necessary to employ ordinary mild steel, or other metals, in building deuterium exchange plants. Apart from the element of cost, there are also matters of certain convenience involved in the construction of plants from mild steel, which is understood by metal workers to be a desirable construction material. However, mild steel is so heavily corroded by this reaction that under normal circumstances its use is impractical.

It was conceived that it might be possible to coat mild steel with certain substances such as Heresite, a plastic, in order to prevent the parts thereof from being corroded. However, it was found that whereas certain of said substances were reasonably satisfactory under ordinary temperatures, they became increasingly unsatisfactory as the temperatures were raised.

The type of corrosive condition that is met in a heat exchanger involves corrosion between cold and hot saturated solutions and between the vapors arising from the solutions. A further complication lies in the fact that the hot saturated gas and water condensate flows from the heat exchanger back to a hot tower, and shortly renders a protective coating ineffective.

The design of a particular plant required that a very large portion of the steel be located in the heat exchangers. It was therefore concluded that the treatment of the surface with a non-metallic plastic offered no real solution to the problem.

An object of the invention is to protect mild steel, and similar materials which are corroded by the process of deuterium exchange between hydrogen sulfide and water, so that they satisfactorily withstand the process. Another object of the invention is to protect the metal out of which the reaction apparatus is made without impairing the efficiency of the reaction itself. Other objects of the invention will be in part apparent and in part set forth as the description proceeds.

The objects of the invention are accomplished, generally speaking, by carrying out the deuterium exchange reaction between hydrogen sulfide and water in the presence of a small amount of a compound from the class consisting of tannic acid, quinoline, isoquinoline, phenyl hydrazine, and piperidine. These compounds, or any of them, may be included in very small amounts in the water which travels through the apparatus.

In order to estimate the rate of corrosion, per year, of steel exposed to the reaction conditions, the following tests were carried out: Coupons of carbon steel SAE 1065 were immersed in a dilute inhibitor solution through which hydrogen sulfide was bubbled. The test was carried out at 100° C. and atmospheric pressure with the coupons half immersed in the boiling solution.

The test was made over a period of 119 hours after which time the samples were removed, washed with water, rinsed in acetone, and dried. They were then immersed for 5 seconds in boiling sodium hydroxide at 300° C. (the mole fraction of sodium hydroxide was approximately .9), removed and cooled, washed thoroughly in water, rinsed in acetone, dried, and weighed. After this treatment microscopic examination showed that the sulfide coating had been completely removed, leaving a metallic surface which in some instances, those of greater corrosion, was pitted.

An untreated sample of carbon steel SAE 1065 was tested in the sodium hydroxide solution to determine the loss in weight of the coupon from attack by this solution. Similar tests were made on a heavily corroded sample of carbon steel. These tests in sodium hydroxide were repeated on the same sample and over periods of time ranging from five seconds to ten minutes, and it was found that the rate of attack was constant with time and that the weight loss per sample was about 0.3 mg. per 5-second period for a sample of 35 square centimeters area, indicating that the error in the final value in the corrosion rate was within the error caused by the inaccuracy of weighing.

The weight loss of a coupon in the hydrogen sulfide corrosion tests combined with the original area of the coupon and the time of immersion was then employed in the usual way to calculate the corrosion rate of penetration in inches per year. A density of 7.7 grams per cubic centimeter was assumed.

Two inhibitors were tested, piperidine and quinoline, over a wide concentration range. The tables following summarize these tests.

Piperidine

| Molarity | Lbs./1,000 tons | Weight change of coupon, mgs. | Area of coupon, sq. cm. | Penetration, inches/yr. |
|---|---|---|---|---|
| $10^{-}$ | 17,200 | 0.9 | 33.9 | 0.0001 |
| $10^{-3}$ | 170 | 13.1 | 33.0 | 0.0015 |
| $10^{-5}$ | 1.7 | 12.9 | 32.6 | 0.0015 |
| $10^{-7}$ | 0.017 | 45.8 | 31.7 | 0.0055 |

Quinoline

| Molarity | Lbs./1,000 tons | Weight change of coupon, mgs. | Area of coupon, sq. cm. | Penetration, inches/yr. |
|---|---|---|---|---|
| $2.5 \times 10^{-3}$ | 620 | 22.1 | 33.0 | 0.0025 |
| $2.5 \times 10^{-5}$ | 6.2 | 85.4 | 33.0 | 0.0098 |
| $2.5 \times 10^{-7}$ | 0.062 | 49.3 | 32.6 | 0.0057 |
| $2.5 \times 10^{-9}$ | 0.00062 | 150 | 32.2 | 0.0175 |

It will be seen from the foregoing figures that the rate of corrosion is very low and that a material improvement is made in the process by the employment of very small quantities of the inhibitor, even at the elevated temperatures under which the reaction is carried out.

As will be understood by persons skilled in the art, the stainless steels are alloys having varied constitution, some of which bear little seeming resemblance to others.

The constitution and the properties of the many so-called stainless steels varies so greatly that it is frequently advisable to include inhibitors of the type herein disclosed, in the process, even when the apparatus is made of stainless steel. In an extension of the invention the process may be used to inhibit the corrosion of steel by hydrogen sulfide solutions wherever they are used together.

During the making of this invention several other substances were conceived which showed promise at ordinary temperatures, but they failed and were not inhibitors when used at temperatures in the vicinity of 100° C.

When apparatus of mild steel, or the like, is used in the apparatus for this deuterium exchange reaction, it is found that it is not substantially pitted over considerable periods of time, and that a great improvement in the efficiency of the process results.

The advantages of this invention are very great. Among them is the fact that apparatus which previously would be pitted to the point of danger in relatively few hours of operation is now capable of going for almost indefinite periods of time without dangerous pitting or deterioration of the steel surfaces. Another advantage of the invention is in the fact that such minute quantities of the inhibitors are used that their presence adds substantially no problem to the operation of the process. A further advantage of the invention is that the inhibitors are themselves neutral to the reaction which is taking place. A fourth advantage of the invention is that each of the inhibitors belongs to a class of substances which is commercially available in adequate quantities at reasonable cost. By virtue of this invention the entire cost of the process both in the cost of materials of construction used and in the cost of labor of repairs is enormously reduced. Another advantage is that the overall efficiency of the process is increased when carried out in ordinary steel apparatus.

We claim:

1. A process for the prevention of corrosion of iron apparatus by a mixture of hydrogen sulfide and water which comprises introducing an organic inhibitor selected from the group consisting of quinoline, isoquinoline, phenylhydrazine, tannic acid, and piperidine into the mixture in contact with said apparatus.

2. In a system wherein hydrogen sulfide gas is contacted with water in an iron apparatus, the improvement which comprises effecting the contact in the presence of an inhibitor dissolved in the water phase, said inhibitor being selected from the group consisting of quinoline, isoquinoline, phenylhydrazine, tannic acid, and piperidine, whereby corrosion of the iron apparatus is inhibited.

References Cited in the file of this patent

UNITED STATES PATENTS

| | | |
|---|---|---|
| 1,877,504 | Grebe et al. | Sept. 13, 1932 |
| 1,988,823 | Winning et al. | Jan. 22, 1935 |
| 2,043,257 | Missbach | June 9, 1936 |